United States Patent [19]

Williams

[11] 4,416,153
[45] Nov. 22, 1983

[54] METHOD OF COMPENSATING A THERMISTOR

[75] Inventor: Robert C. Williams, Churchville, Pa.

[73] Assignee: Innovative Medical Systems, Corp., Ivyland, Pa.

[21] Appl. No.: 358,463

[22] Filed: Mar. 15, 1982

[51] Int. Cl.³ ............................................. G01F 23/22
[52] U.S. Cl. ...................................... 73/295; 137/392; 364/509; 364/571
[58] Field of Search .................. 73/295; 364/509, 571; 374/181, 182; 137/392, 101.25

[56]  References Cited

U.S. PATENT DOCUMENTS 4,319,233  3/1982  Matsuoka et al. ................. 73/295 X
4,361,037  11/1982  Hauschild et al. ..................... 73/295

FOREIGN PATENT DOCUMENTS 2037990  7/1980  United Kingdom ................... 73/295

Primary Examiner—Herbert Goldstein
Assistant Examiner—Joseph W. Roskos
Attorney, Agent, or Firm—Robert J. Mooney

[57]  ABSTRACT

A computer-aided monitoring system and associated technique is disclosed for automatically controlling the liquid level of a heated tank subjected to changing temperatures. A first voltage signal from a thermistor sensor mounted within the tank at a predetermined level is digitally converted to multi-bit data indicative of fluid level. A second voltage signal produced by a separate thermistor sensor attached to the tank is digitally encoded as an indication of tank temperature and used to address a look-up table of voltage threshold values stored in a read-only memory. Empirically determined to vary linearly as a function of tank temperature, the voltage threshold values addressed are compared with the digital level data to determine if the liquid flow to the tank should be discontinued via a central processing unit.

6 Claims, 2 Drawing Figures

METHOD OF COMPENSATING A THERMISTOR

BACKGROUND OF THE INVENTION

The present invention relates to liquid level measurement and control using temperature-sensitive sensors, and more particularly to a computer-aided system and associated technique for accurately monitoring and automatically controlling liquid levels in a tank despite variations in tank temperature.

Semiconductor thermistor elements are commonly employed as temperature-sensitive sensors in a variety of liquid level control systems designed to indicate and regulate the amount of liquid present in a tank or reservoir. In such control systems, the thermistor elements, which change their electrical resistance with absolute temperature, are typically mounted within the tank or reservoir at a certain predetermined height above the bottom of the tank and at a certain preconditioned temperature unexposed to the liquid. Generally, thermistors having negative temperature coefficients of resistance are employed and heated with applied current to initially reduce their resistance. If the liquid reaches the predetermined level in the tank and the thermistor becomes submerged, the thermistor will be cooled because of the greater thermal conductivity of the liquid and the thermistor resistance will increase. The resulting voltage increases across the thermistor is typically detected by a sensor circuit and used either to provide an overflow alarm signal or to control pumps and valves that will halt or reverse the liquid flow.

While thermistor control systems have been generally successful in liquid level monitoring and measurement, such systems have experienced a critical problem in their application to certain types of automated processing involving the control of liquid levels within tanks that are themselves heated to maintain the liquid at an elevated temperature. In such automated processing applications, frequently involving medical laboratory testing, increases in the tank temperature are unavoidably sensed by the thermistors and effectively offset the cooling effect of the rising liquid contacting the thermistor so that there is little or no change in the absolute temperature of the thermistor. As a result, there is no indication of an actual liquid level attainment and a dangerous and damaging overflow may occur. This problem of liquid overflow from heated tanks has been particularly evident with liquids of relatively low thermal conductivity, such as liquid wax.

SUMMARY OF THE INVENTION

Accordingly, it is a general purpose and object of the present invention to provide an improved temperature-sensitive system and associated technique for monitoring and controlling the level of liquid in a tank or reservoir.

Another object of the present invention is to provide an improved thermistor control system and method that accurately monitors the level of liquid in a heated tank by compensating for thermistor readings adversely affected by variations in tank temperature.

Still another object of the present invention is to provide a temperature-compensating liquid level monitoring technique that is quick and reliable in performance, and easily adapted to a variety of automatic processing applications.

Briefly, these and other objects of the present invention are accomplished by a computer-aided monitoring system and associated technique for automatically controlling the liquid level of a heated tank subject to changing temperatures. A first voltage signal from a thermistor sensor mounted within the tank at a predetermined level is digitally converted to multi-bit level data. A second voltage signal produced by a separate thermistor sensor attached to the tank is digitally encoded as an indication of tank temperature and used to address a look-up table of voltage threshold values stored in a read-only memory. Empirically determined to vary linearly as a function of tank temperature, the voltage threshold values addressed are compared with the digital level data to determine if the liquid flow to the tank should be discontinued via a central processing unit.

For a better understanding of these and other aspects of the present invention, reference may be made to the following detailed description taken in conjunction with the accompanying drawing in which like reference characters designate like items throughout the figures thereof.

DESCRIPTION OF THE PREFERRED EMBODIMENT

Figure 1:
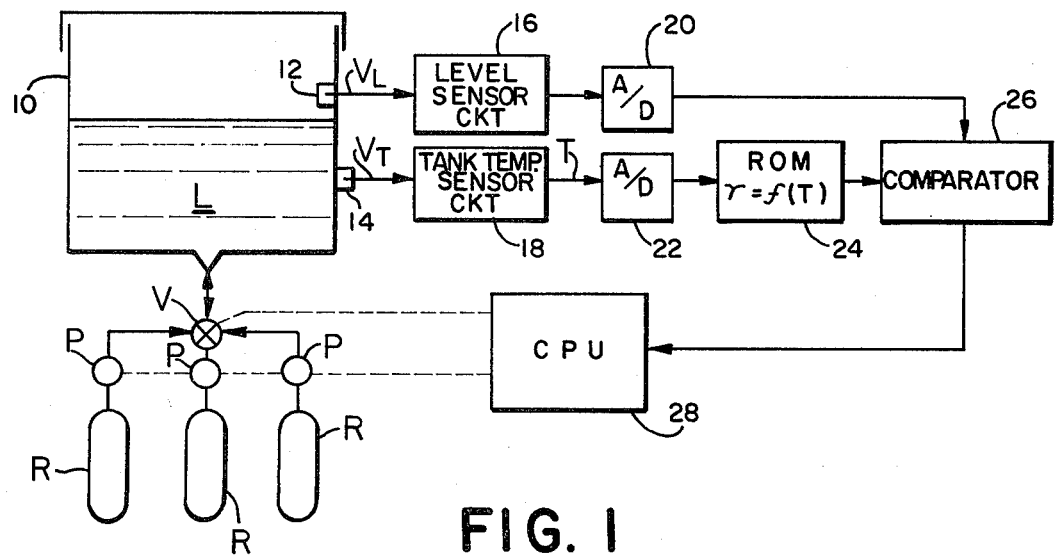
FIG. 1 is a block diagram showing a liquid level control system in accordance with the present invention.

Referring now to FIG. 1, there is shown a processing tank 10 containing an increasing amount of a liquid L. The processing tank 10 is heated, typically by electrical coils (not shown), to maintain the liquid L at an elevated temperature as required by the particular processing application. The liquid L is fed to and from the tank 10 via a valve V and a plurality of pumps P under the control of a central processing unit 28 of conventional electronic design. A plurality of reservoirs R coupled to the tank 10 are used to store the liquid L.

A conventional thermistor sensor 12, typically having a negative temperature coefficient of resistance, is mounted within tank 10 at a predetermined level at which the amount of liquid L held by the tank for the particular processing application is to be limited. Level sensor 12 is designed to produce a voltage signal $V_L$ indicative of the presence or absence of liquid L at the predetermined level, and is preconditioned at an elevated absolute temperature, for example, 200° C., by applied current so that the contact of liquid upon its surface causes a significant reduction in the absolute temperature of the sensor, and as a result, a significant increase in the amplitude of its voltage signal. A level sensor circuit 16 of conventional design is connected to receive the level voltage signal $V_L$ from sensor 12 for appropriately processing the analog signal for digital conversion. A conventional analog-to-digital converter 20 digitally encodes the processed level voltage signal $V_L$ thereby producing multi-bit data, typically of 8-bits, corresponding to the amplitude of the level voltage signal.

A separate thermistor sensor 14, similar to that of sensor 12, is attached to the wall of tank 10 unexposed to the liquid L to detect the temperature of the tank. A voltage signal $V_T$ is produced by the thermistor sensor 14 based upon its resistance-temperature curve and the signal is fed to a tank temperature sensor circuit 18 of conventional electronic design for analyzing the signal in accordance with the known characteristics of the sensor so that an analog signal T is produced indicative of the tank temperature. An analog-to-digital converter 22, similar to A/D converter 20, digitally encodes the analog signal T so that multi-bit data is produced corresponding to the detected tank temperature.

Figure 2:
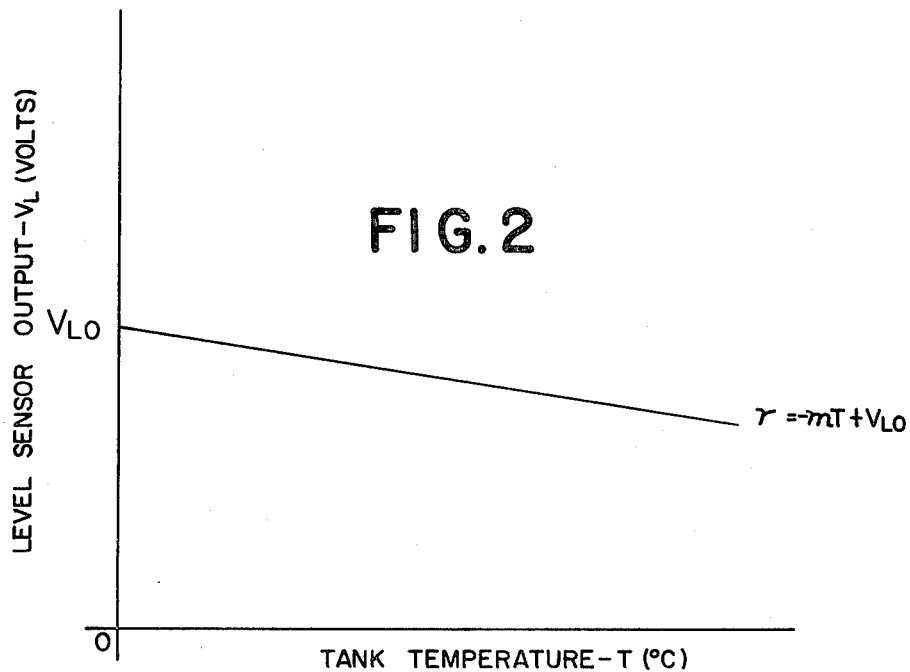
FIG. 2 is a general graphic representation of the voltage threshold function employed in conjunction with the liquid level control system of FIG. 1.

A conventional read-only memory (ROM) 24, or other similar digital storage device, is connected to receive at its input the multi-bit digital data from A/D converter 22. Read-only memory 24 is stored with a look-up table of voltage threshold values T which correspond to the voltage level response of thermistor sensor 12 having is absolute temperature affected both by contact with liquid L and by the elevated temperature of tank 10. Empirically determined for thermistor sensor 12 to be negatively-sloped linear function of the temperature T of tank 10, as shown in FIG. 2, the look-up table of voltage threshold values T is addressed by the temperature-encoded digital data produced by the A/D converter 22 so that the ROM 24 produces the digital threshold value corresponding to the appropriate tank temperature. The table look-up is readily constructed by determining the temperature range to which the tank is subjected and then dividing the range by $2^n$ where n is a convenient integer. For example, if in a particular process the tank temperature varies from 25° C. to 70° C., the 40 degree operating range may be divided into 256 increments to each of which individual threshold values may be assigned consistent with the previously empirically established linear variation from 25° C. to 70° C.

A conventional digital comparator 26 is connected to receive both the voltage-level encoded digital data from A/D converter 20 and the digitized voltage threshold value T from ROM 24 for their comparison. If the voltage-level data corresponding to voltage signal $V_L$ is less than the voltage threshold value T, thermistor sensor 12 is declared to be dry and comparator 26 permits the flow of liquid L into tank 10 to continue. If the same voltage level data is equal to or greater than the most recent voltage threshold value T produced from ROM 24, the thermistor sensor 12 is declared to be wet and comparator 26 appropriately signals the central processing unit 28 to discontinue the flow of liquid L into tank 10.

Therefore, it should now be apparent that the disclosed liquid level control system provides an improved temperature-sensitive system and associated technique for monitoring and controlling the level of liquid in a tank, particularly a heated tank subject to changes in its temperature, by compensating for thermistor level readings affected by the change in tank temperature. In addition, the disclosed invention provides a computer-aided liquid level control technique that is quick and reliable in performance and easily adapted to a variety of automatic processing applications.

Obviously, other embodiments and modifications of the present invention will readily come to those of ordinary skill in the art having the benefit of the teachings presented in the foregoing description and drawing. It is therefore to be understood that various changes in the details, materials, steps, and arrangement of parts, which have been described and illustrated to explain the nature of the invention, may be made by those skilled in the art within the principle and scope of the invention as expressed in the appended claims.

I claim:

1. A system for controlling the level of liquid applied to a tank which is subjected to temperature variations, comprising:

first thermal sensor means adapted to be mounted within the tank at a predetermined threshold level for producing a first analog signal indicative of absolute temperature at the level;

second thermal sensor means adapted to be attached to the tank for producing a second analog signal indicative of tank temperature;

digital encoder means for converting said first and second analog signals to respective first and second digital data signals;

digital storage means addressed by said second digital data signal and stored with discrete values of a voltage threshold function related to tank temperature for producing an appropriate threshold value upon the address of said second digital data signal; and a digital comparator connected to said encoder means and said storage means for signaling the discontinuance of liquid flow to the tank when the magnitude of said first digital data signal is equal to or greater than said threshold value.

2. A liquid level control system according to claim 1, further comprising:

a central processing unit connected to said comparator for executing the signaled instruction thereof.

3. A liquid level control system according to claim 2, wherein said first and second thermal sensor means each comprise:

a thermistor having a known temperature-related output curve; and sensor circuit for processing the output of said thermistor in accordance with its output curve.

4. A liquid level control system according to claim 2, wherein said digital storage means comprises a read-only memory.

5. A method of controlling liquid levels of a tank subjected to temperature variations, comprising the steps of:

producing a first analog signal indicative of absolute temperature at a predetermined threshold level within the tank;

simultaneously producing a second analog signal indicative of tank temperature;

converting said first and second analog signal to respective first and second digital data signals;

digitally establishing a voltage threshold value based upon the tank temperature;

comparing the magnitude of the determined threshold value with the magnitude of said first digital data signal; and signaling the discontinuance of liquid flow to the tank when the magnitude of said first digital data signal is equal to or greater than said threshold value.

6. A liquid level control method according to claim 5, wherein said steps of digitally establishing the threshold value comprises:

storing discrete values of an empirically determined voltage threshold function into an addressable digital store; and addressing the discrete values with said second digital data signal.

* * * * *